(12) United States Patent
Huang et al.

(10) Patent No.: US 8,964,277 B2
(45) Date of Patent: Feb. 24, 2015

(54) COLOR-CHANGEABLE PROTECTIVE DEVICE AND PORTABLE DEVICE

(71) Applicant: Wistron Corporation, New Taipei (TW)

(72) Inventors: Yao-Han Huang, New Taipei (TW); Hsih-Bin Dai, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/649,130

(22) Filed: Oct. 11, 2012

(65) Prior Publication Data

US 2013/0320821 A1    Dec. 5, 2013

(30) Foreign Application Priority Data

May 31, 2012    (TW) ............... 101119600 A

(51) Int. Cl.
| | | |
|---|---|---|
| G02F 1/15 | (2006.01) | |
| G02F 1/03 | (2006.01) | |
| G02F 1/153 | (2006.01) | |
| G09G 3/19 | (2006.01) | |
| H04N 9/16 | (2006.01) | |

(52) U.S. Cl.
USPC ............ 359/265; 359/242; 359/275; 345/49; 348/817

(58) Field of Classification Search
USPC ......... 359/265–275, 277, 245–247, 254, 242; 345/49, 105; 250/70; 348/814, 817; 438/929; 349/182–186
See application file for complete search history.

(56) References Cited

U.S. PATENT DOCUMENTS

| | | | |
|---|---|---|---|
| 5,457,564 A | * | 10/1995 | Leventis et al. ............... 359/271 |
| 2006/0028721 A1 | * | 2/2006 | Smythe et al. ............... 359/443 |
| 2007/0103762 A1 | | 5/2007 | Chang |
| 2008/0192013 A1 | * | 8/2008 | Barrus et al. ................. 345/173 |
| 2010/0238664 A1 | * | 9/2010 | Steenbergen ................. 362/276 |
| 2012/0050975 A1 | * | 3/2012 | Garelli et al. ............. 361/679.27 |

OTHER PUBLICATIONS

"Office Action of Taiwan Counterpart Application" with English translation thereof, issued on May 29, 2014, p. 1-p. 10.

* cited by examiner

*Primary Examiner* — Dawayne A Pinkney
(74) *Attorney, Agent, or Firm* — Jianq Chyun IP Office

(57) ABSTRACT

A color-changeable protective device for a portable device equipped with a touch screen is provided. The color-changeable protective device comprises a power source and a electro-chromic element. The electro-chromic element is disposed to correspond to the touch screen so as to cover the entire touch screen. According to whether the operating status of the electro-chromic element is a power-on operating status, the electro-chromic element appears to be transparent or opaque.

14 Claims, 3 Drawing Sheets

COLOR-CHANGEABLE PROTECTIVE DEVICE AND PORTABLE DEVICE

CROSS-REFERENCE TO RELATED APPLICATION

This application claims the priority benefit of Taiwan application Ser. No. 101119600, filed on May 31, 2012. The entirety of the above-mentioned patent application is hereby incorporated by reference herein and made a part of this specification.

BACKGROUND OF THE INVENTION

1. Field of Invention

The present disclosure relates to a protective device and a portable device. More particularly, the present disclosure relates to a color-changeable protective device of the portable device.

2. Description of Related Art

Generally, the portable device, such as the smart phone, the personal digital assistant (PDA), the portable multi-media player, the tablet personal computer, are now developed to be lighter, thinner, and easier to carry around. Further, with the development of the technology of the touch panel, the current portable device are developed to use the touch screen as the user operating interface. As these portable devices are light and compact, protective cases (or protective jacket) are needed for protecting outer layers of the portable devices to prevent accidental damages or breakages. Moreover, it is necessary to have a protective cover for the touch screen to prevent the touch screen from being impacted or scratched by the objects other than the input device while the user carries the portable device.

Typically, the protective cases for the portable devices are made of rubber, metal or plastic. These protective cases are only used to protect the outer layers of the portable device without having any special circuit functions. Moreover, as for the flip-type protective cover for the touch screen, the user needs to lift the protective cover and then performs the operations on the touch screen. However, the process for lifting the protective cover leads to the portable device additionally outwardly extending the protective cover to increase the whole volume of the portable device. Therefore, the convenience of the portable device is decreased.

SUMMARY OF THE INVENTION

The disclosure provides a color-changeable protective device capable of protecting the outer layer and the touch screen of the portable device.

The disclosure provides a portable device of which the touch screen can be operated through the protective case without removing the protective case.

The disclosure provides a color-changeable protective device for a portable device having a touch screen. The color-changeable protective device comprises a power supply device and an electro-chromic element. The electro-chromic element is coupled to the power supply device, wherein the electro-chromic element is configured to correspond to the touch screen so as to entirely cover the touch screen. Also, according to whether an operating status of the electro-chromic element is a power-on status, the whole electro-chromic element appears to be at a transparent state or an opaque state.

According to one embodiment of the present disclosure, when the operating status is the power-on status, the electro-chromic element appears to be at the opaque state so as to entirely cover a frame displayed by the touch screen, and when the operating status is a power-off status, the electro-chromic element appears to be at the transparent state so that the frame displayed by the touch screen is totally perceived through the electro-chromic element.

According to one embodiment of the present disclosure, when the operating status is a power-off status, the electro-chromic element appears to be at the opaque state so as to entirely cover a frame displayed by the touch screen, and when the operating status is the power-on status, the electro-chromic element appears to be at the transparent state so that the frame displayed by the touch screen is totally perceived through the electro-chromic element.

According to one embodiment of the present disclosure, the aforementioned color-changeable protective device further comprises an outer case enclosing the portable device. The outer case comprises an upper flip cover, a bottom plate and a pivot part. The electro-chromic element is configured on the upper flip cover and the upper flip cover covers a first surface of the portable device, wherein the touch screen is configured on the first surface of the portable device. The power supply device is configured on the bottom plate and the bottom plate covers a second surface of the portable device opposite to the first surface of the portable device. The pivot part is connected between the upper flip cover and the bottom plate so that the outer case can be opened or closed by moving the upper flip cover and the bottom plate in opposite directions respectively, wherein the portable device is clipped between the upper flip cover and the bottom plate.

According to one embodiment of the present disclosure, the power supply device includes a solar cell.

According to one embodiment of the present disclosure, the portable device comprises a device case, the electro-chromic element is coupled to the touch screen and the electro-chromic element and the touch screen are together configured on the device case of the portable device.

The disclosure further provide a portable device comprising a device case, a touch screen and an electro-chromic element. The touch screen is configured on the device case and displays a frame. The electro-chromic element is coupled to the touch screen so as to entirely cover the touch screen, wherein when the electro-chromic element is at a first power status, the electro-chromic element appears to be at an opaque state to cover the frame displayed by the touch screen, and when the electro-chromic element is at a second power status, the electro-chromic element appears to be at a transparent state so that the frame displayed by the touch screen is totally perceived through the electro-chromic element.

According to one embodiment of the present disclosure, when the first power status is a power-on status, and the second power status is a power-off status.

According to one embodiment of the present disclosure, when the first power status is a power-off status, and the second power status is a power-on status.

According to one embodiment of the present disclosure, the portable device further comprises a solar cell coupled to the electro-chromic element for providing a power to the electro-chromic element.

Accordingly, in the color-changeable protective device, the solar cell provides the power to the electro-chromic element for changing the color of the electro-chromic element. The color-changeable protective device can be assembled to be an additional protective case of the portable device. Also, the color-changeable protective device can be directly integrated with the touch screen of the portable device and configured on the case of the portable device. Hence, the color-changeable protective device can provide a protective function for the case and the touch screen of the portable device. The user can operate the touch screen directly through the electro-chromic element without removing the protective case.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE PREFERRED EMBODIMENTS

Figure 1:
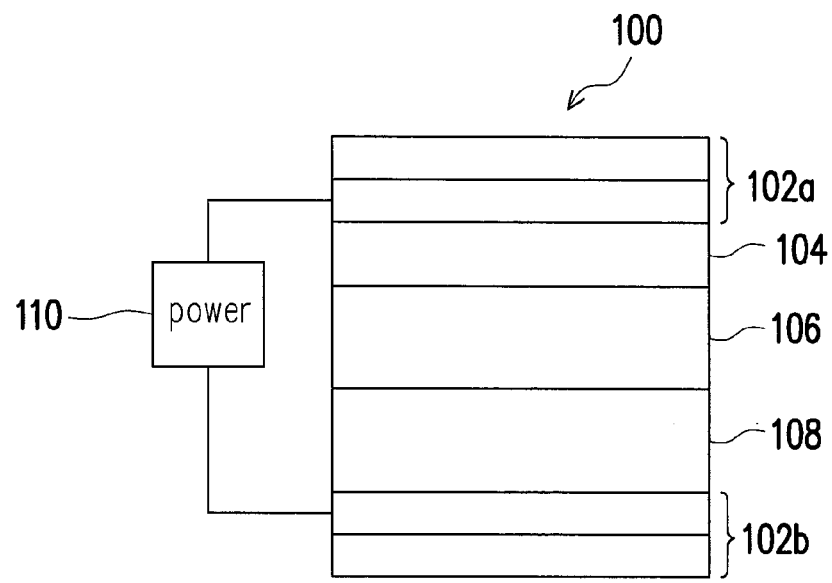
FIG. 1 is a schematic diagram showing a structure of an electro-chromic element according to one embodiment of the present disclosure.

FIG. 1 is a schematic diagram showing a structure of an electro-chromic element according to one embodiment of the present disclosure. As shown in FIG. 1, the electro-chromic element 100 can be formed by, for example, two transparent conductive substrates (102a and 102b) with ion storage layer 104, electrolyte layer 106 and the electro-chromic layer 108 stacked on one another therebetween. The transparent conductive substrates 102a and 102b are connected to a power 110 respectively. It should be noticed that when a voltage bias (such as 1.5~2 voltage) is applied between the transparent conductive substrates 102a and 102b to electrify the electro-chromic element 100, a reversible chemical reaction is initiated on the electro-chromic layer 108 due to the current passing through the electro-chromic layer 108. The reversible chemical reaction can be, for example, oxidation-reduction reaction. The reversible chemical reaction initiated on the electro-chromic layer 108 leads to the change of the transparency of the electro-chromic layer 108. When the power supplied to the electro-chromic layer 108 is cut off, the transparency of the electro-chromic layer is changed back to the transparency before the electro-chromic layer is electrified due to the reversible chemical reaction. Whether the electro-chromic layer 108 appears to be at the transparent state or the opaque state depends on the properties of the material of the electro-chromic layer 108. For instance, under the circumstance that the electro-chromic layer 108 appears to be at the transparent state as there is no current passing through the electro-chromic layer 108, the electro-chromic layer 108 is changed from the transparent state to the opaque state when a voltage bias is applied between the transparent conductive substrates 102a and 102b. In another embodiment, under the circumstance that the electro-chromic layer 108 appears to be at the opaque state as there is no current passing through the electro-chromic layer 108, the electro-chromic layer 108 is changed from the opaque state to the transparent state when a voltage bias is applied between the transparent conductive substrates 102a and 102b.

Figure 2:
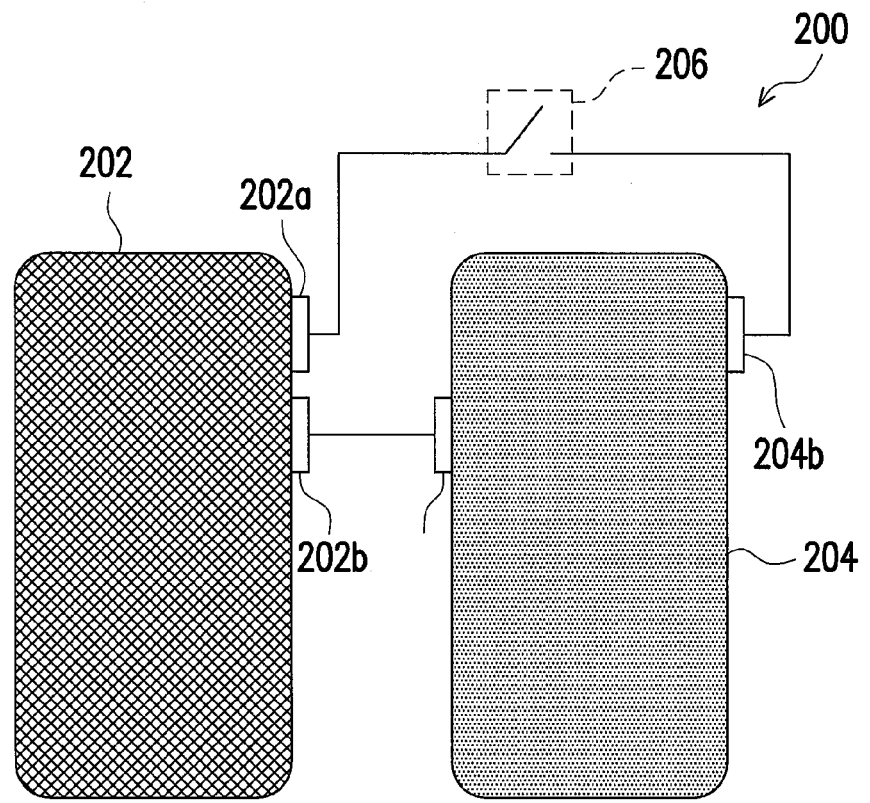
FIG. 2 is a schematic diagram showing a circuit of a color-changeable protective device according to one embodiment of the present disclosure.

FIG. 2 is a schematic diagram showing a circuit of a color-changeable protective device according to one embodiment of the present disclosure. As shown in FIG. 2, in the present embodiment, the electro-chromic element 100 shown in FIG. 1 is applied onto a color-changeable protective device 200. The color-changeable protective device 200 comprises a power supply device 202 and a electro-chromic element 204. The electro-chromic element 204 is coupled to the power supply device 202 and the power supply device 202 can be, for example, a solar cell. In other words, as shown in FIG. 2, the anode 202a of the power supply device 202 is electrically connected to the anode 204a of the electro-chromic element 204, and the cathode 202b of the power supply device 202 is electrically connected to the cathode 204b of the electro-chromic element 204. Moreover, the color-changeable protective device 200 further comprises a switch 206. Therefore, the user can turn on or turn off the power of the color-changeable protective device. Furthermore, the color-changeable protective device 200 is adopted by the portable device having the touch screen (not shown), such as the smart phone, the personal digital assistant (PDA), the portable digital multimedia player and the tablet personal computer, and the electro-chromic element 204 is configured to correspond to the touch screen so as to entirely cover the touch screen. Moreover, according to whether the operating status of the electro-chromic element 204 is a power-on status or a power-off status (i.e. the electrifying operating status), the whole electro-chromic element appears to be at a transparent state or an opaque state.

That is, when the property of electro-chromic layer of the electro-chromic element 204 is that the electro-chromic layer is transparent as there is no current passing through the electro-chromic layer and the electro-chromic layer is opaque as the current passes through the electro-chromic layer, the electro-chromic element 204 appears to be at the opaque state to entirely cover the frame displayed by the touch screen as the operating status of the electro-chromic element is the power-on status. On the other hand, when the operating status of the electro-chromic element is the power-off status (i.e. there is no current passing through the electro-chromic element), the electro-chromic element 204 appears to be at the transparent state and the user can perceives the frames displayed by the touch screen through the electro-chromic element. In another embodiment, when the property of electro-chromic layer of the electro-chromic element 204 is that the electro-chromic layer is opaque as there is no current passing through the electro-chromic layer and the electro-chromic layer is transparent as the current passes through the electro-chromic layer, the electro-chromic element 204 appears to be at the opaque state to entirely cover the frame displayed by the touch screen as the operating status of the electro-chromic element is the power-off status (i.e. there is no current passing through the electro-chromic element). On the other hand, when the operating status of the electro-chromic element is the power-on status, the electro-chromic element 204 appears to be at the transparent state and the user can perceives the frames displayed by the touch screen through the electro-chromic element.

Figure 3A:
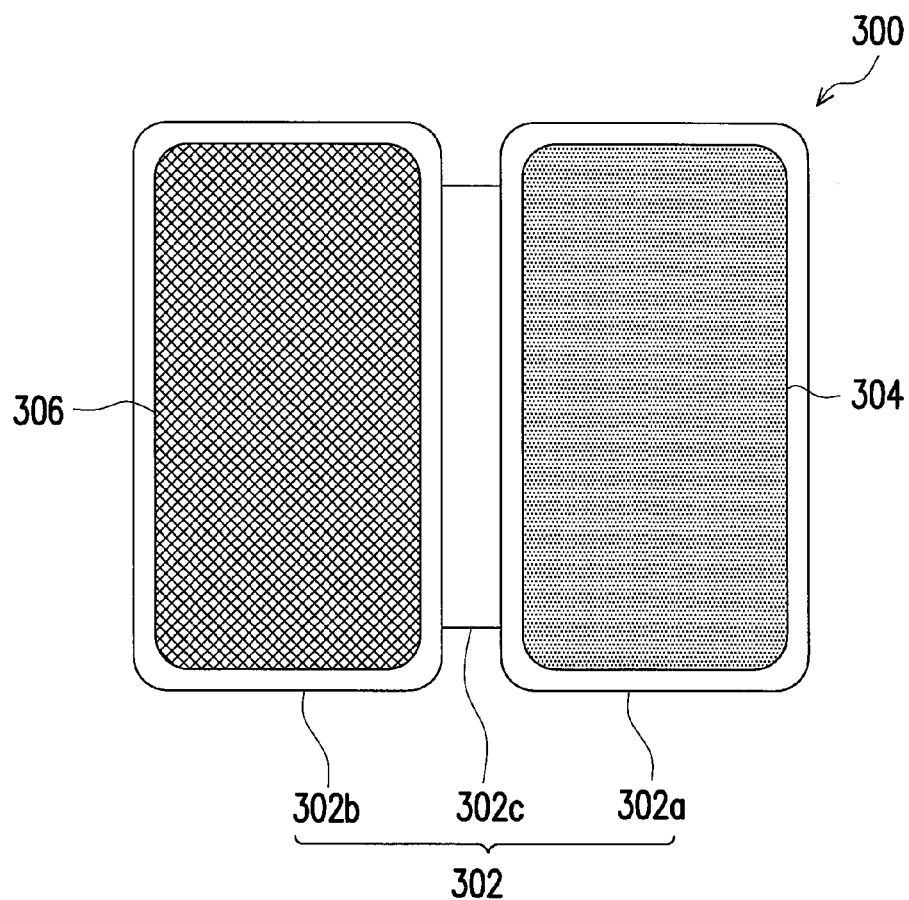
FIG. 3A is a top view showing a color-changeable protective device according to one embodiment of the present disclosure.
Figure 3B:
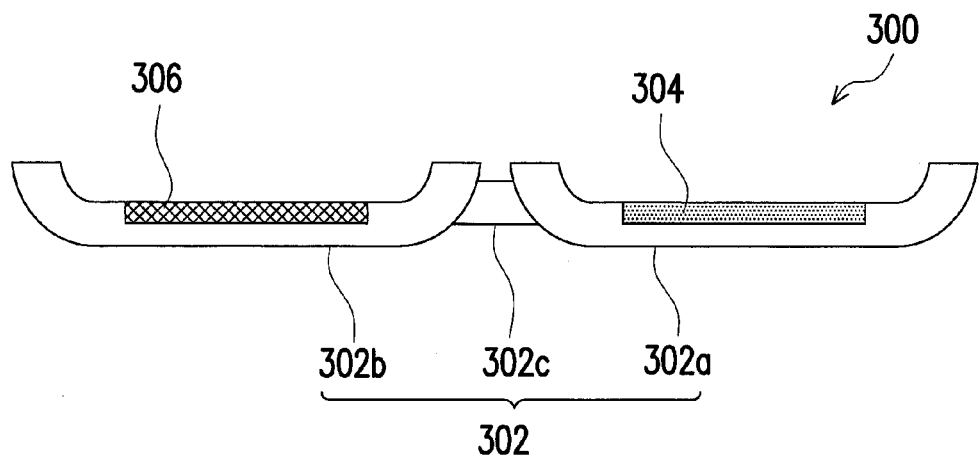
FIG. 3B is a schematically cross-sectional view of the color-changeable protective device shown in FIG. 3A.
Figure 3C:
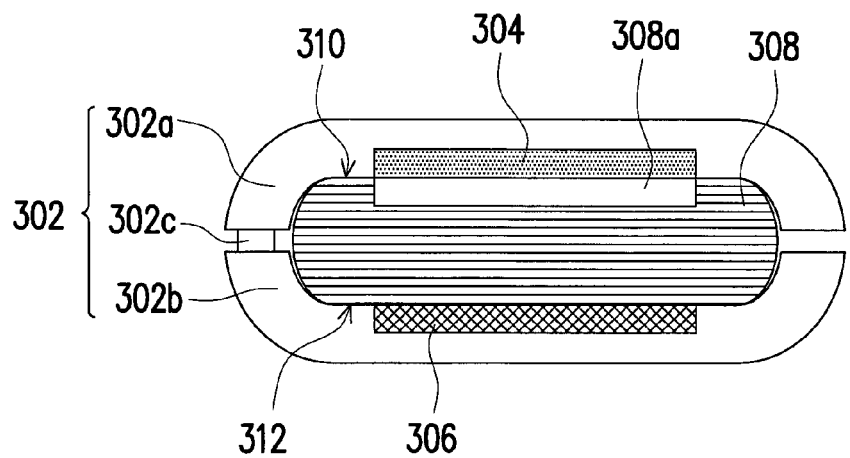
FIG. 3C is a schematic diagram showing the color-changeable protective device of FIG. 3A clipping a portable device.

FIG. 3A is a top view showing a color-changeable protective device according to one embodiment of the present disclosure. FIG. 3B is a schematically cross-sectional view of the color-changeable protective device shown in FIG. 3A. FIG. 3C is a schematic diagram showing the color-changeable protective device of FIG. 3A clipping a portable device. FIGS. 3A, 3B and 3C show one of the exemplary embodiments of the color-changeable protective devices of the present disclosure. As shown in FIG. 3A and FIG. 3B, in the present embodiment, the color-changeable protective device 300 comprises an outer case 302, an electro-chromic element 304 and a power supply device 306. The outer case 302 further comprises an upper flip cover 302a, a bottom plate 302b and a pivot part 302c. The electro-chromic element 304 is configured on the upper flip cover 302a and the power supply device 306 is configured on the bottom plate 302b. Additionally, the pivot part 302c is connected between the upper flip cover 302a and the bottom plate 302b so that the outer case 302 can be opened and closed by moving the upper flip cover 302a and the bottom plate 302b in opposite directions respectively. Further, the power wire is electrically connected between the power supply device 302 and the electro-chromic element 304 through the pivot part 302c. As shown in FIG. 3C, the outer case 300 equipped with the electro-chromic element 304 and the power supply device 306 encloses the portable device 308. That is, the pivot part 302c is connected between the upper flip cover 302a and the bottom plate 302b so that the upper flip cover 302a and the bottom plate 302b can be moved in opposite directions respectively to open or close the outer case and the portable device 308 are clipped between the upper flip cover 302a and the bottom plate 302b. It should be noticed that the upper flip cover 302a covers a first surface 310 of the portable device 308 having the touch screen 308a thereon. Also, the bottom plate 302b covers a second surface 312 of the portable device 308 opposite to the first surface 310 of the portable device 308.

In the present embodiment, the color-changeable device 300 is in a form of outer protective case enclosing the portable device 308. The electro-chromic element 304 is configured on the upper flip cover 302a of the outer case 302 of the color-changeable protective device 300. When the upper flip cover 302a and the bottom plate 302b are moved toward to each other to close the outer case 302 and to enclose the portable device 308, the electro-chromic element 304 is disposed over or even attached to the touch screen 308a of the portable device 308. Thus, by changing the electrifying operating status, the electro-chromic element appears to be at the transparent state or at the opaque state. Therefore, the frame displayed by the touch screen 308a is perceived through the electro-chromic element or is sheltered by the electro-chromic element. The user can operates the touch screen 308a through the electro-chromic element 304. Also, the user can lift the upper flip cover 302a of the outer case 302 of the color-changeable protective device 300 and performs the operations directly on the touch screen.

Figure 4:
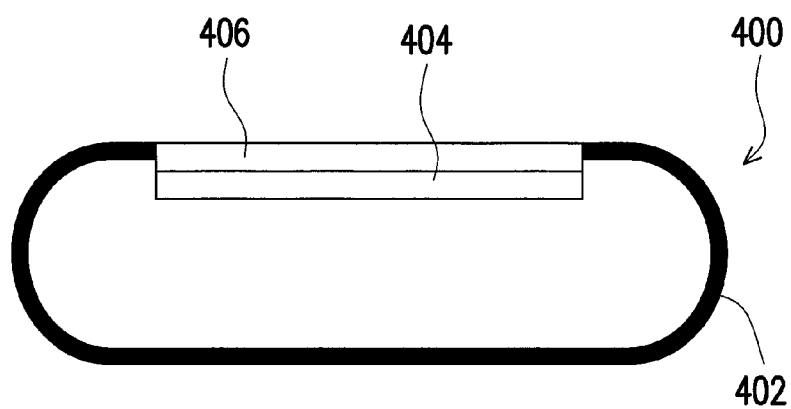
FIG. 4 is a schematically cross-sectional view showing a portable device according to another embodiment of the present disclosure.

FIG. 4 is a schematically cross-sectional view showing a portable device according to another embodiment of the present disclosure. FIG. 4 shows another exemplary embodiment of the color-changeable protective device of the present disclosure. As shown in FIG. 4, the portable device 400 comprises a device case 402 and a touch screen 404. The electro-chromic element 406 of the color-changeable protective device is coupled to the touch screen 404, and the electro-chromic element 406 and the touch screen 404 are attached on each other and are together configured on the device case 402 of the portable device 400.

In other words, when the electro-chromic element is regarded as one of the elements for assembling the portable device, the portable device 400 comprises the device case 402, the touch screen 404 and the electro-chromic element 406. The touch screen 404 is configured on the device case 402 to display a frame. The electro-chromic element 406 is coupled to the touch screen 404 and covers the entire of the touch screen 404. That is, the whole electro-chromic element 406 is directly attached on the touch screen 404 to be the protective cover of the touch screen 404, and the electro-chromic element 406 and the touch screen 404 are together configured on the device case 402 of the portable device 400. Hence, the user can operate the touch screen 404 through the electro-chromic element 406.

Altogether, in the color-changeable protective device of the present disclosure, the solar cell provides the power to the electro-chromic element for changing the color of the electro-chromic element. The color-changeable protective device can be assembled to be an additional protective case of the portable device. Also, the color-changeable protective device can be directly integrated with the touch screen of the portable device and configured on the case of the portable device. Hence, the color-changeable protective device can provide a protective function for the case and the touch screen of the portable device. The user can operate the touch screen directly through the electro-chromic element without removing the protective case.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. A color-changeable protective device for a portable device having a touch screen, the color-changeable protective device comprising:
    a power supply device; and
    an electro-chromic element coupled to the power supply device, wherein the electro-chromic element is configured to dispose on a touch display surface of the touch screen so as to protect and entirely cover the touch screen, and only according to whether an operating status of the electro-chromic element is a power-on status, the electro-chromic element appears to be at a transparent state or an opaque state,
    wherein when the electro-chromic element appears to be at the opaque state, a frame displayed by the touch screen is entirely covered by the opaque electro-chromic element, and
    when the electro-chromic element appears to be at the transparent state, the frame displayed by the touch screen is totally perceived through the electro-chromic element, so that an user operates the touch screen directly through the electro-chromic element.

2. The color-changeable protective device of claim 1, wherein when the operating status is the power-on status, the electro-chromic element appears to be at the opaque state so as to entirely cover the frame displayed by the touch screen.

3. The color-changeable protective device of claim 2, wherein when the operating status is a power-off status, the electro-chromic element only appears to be at the transparent state so that the frame displayed by the touch screen is totally perceived through the electro-chromic element.

4. The color-changeable protective device of claim 1, wherein when the operating status is a power-off status, the electro-chromic element appears to be at the opaque state so as to entirely cover a frame displayed by the touch screen, and when the operating status is the power-on status, the electro-chromic element only appears to be at the transparent state so that the frame displayed by the touch screen is totally perceived through the electro-chromic element.

5. The color-changeable protective device of claim 1, further comprising an outer case, wherein the outer case encloses the portable device.

6. The color-changeable protective device of claim 5, wherein the outer case comprises:
   an upper flip cover, wherein the electro-chromic element is configured on the upper flip cover and the upper flip cover covers a first surface of the portable device having the touch screen thereon;
   a bottom plate, wherein the power supply device is configured on the bottom plate and the bottom plate covers a second surface of the portable device opposite to the first surface of the portable device; and
   a pivot part connected between the upper flip cover and the bottom plate so that the outer case can be opened or closed by moving the upper flip cover and the bottom plate in opposite directions respectively, wherein the portable device is clipped between the upper flip cover and the bottom plate.

7. The color-changeable protective device of claim 5, wherein the power supply device includes a solar cell.

8. The color-changeable protective device of claim 1, wherein the portable device comprises a device case, the electro-chromic element is coupled to the touch screen and the electro-chromic element and the touch screen are together configured on the device case of the portable device.

9. A portable device, comprising:
   a device case;
   a touch screen configured on the device case and displaying a frame; and
   an electro-chromic element disposed on a touch display surface of the touch screen so as to protect and entirely cover the touch screen, wherein only when the electro-chromic element is at a first power status, the electro-chromic element appears to be at an opaque state to cover the frame displayed by the touch screen, and only when the electro-chromic element is at a second power status, the electro-chromic element appears to be at a transparent state so that the frame displayed by the touch screen is totally perceived through the electro-chromic element and therefore an user operates the touch screen directly through the electro-chromic element.

10. The portable device of claim 9, wherein the first power status is a power-on status.

11. The portable device of claim 10, wherein the second power status is a power-off status.

12. The portable device of claim 9, wherein the first power status is a power-off status.

13. The portable device of claim 12, wherein the second power status is a power-on status.

14. The portable device of claim 9, further comprising a solar cell coupled to the electro-chromic element for providing a power to the electro-chromic element.

\* \* \* \* \*